(12) United States Patent
Lee et al.

(10) Patent No.: US 6,295,143 B1
(45) Date of Patent: Sep. 25, 2001

(54) APPARATUS AND METHOD OF DETECTING A SCANNING RANGE WHEN APPLYING ASSISTANT FRAMES FOR FLATBED SCANNERS

(75) Inventors: Wayne Lee, Miao Li; Jenn-Tsair Tsai, Taipei; Flyinga Liao, Chung Li, all of (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/026,377

(22) Filed: Feb. 19, 1998

(30) Foreign Application Priority Data

Jul. 24, 1997 (TW) ................................. 86110566

(51) Int. Cl.$^7$ ................................. H04N 1/04; H04N 1/40

(52) U.S. Cl. ........................... 358/487; 358/506; 358/449

(58) Field of Search .................................. 358/488, 487, 358/449, 506, 453; 382/319, 290, 291, 292; 355/75, 40, 122; 206/455

(56) References Cited

U.S. PATENT DOCUMENTS

| | | | | |
|---|---|---|---|---|
| 5,128,711 | * | 7/1992 | Terashita et al. | 355/41 |
| 5,153,737 | * | 10/1992 | Kobayashi | 358/296 |
| 5,223,904 | * | 6/1993 | Umezawa | 355/311 |
| 5,327,259 | * | 7/1994 | Furusawa | 358/487 |
| 5,519,483 | * | 5/1996 | Kawanishi et al. | 355/75 |
| 5,742,855 | * | 4/1998 | Saito et al. | 355/40 |
| 5,749,468 | * | 5/1998 | Manico | 206/455 |
| 5,778,276 | * | 7/1998 | Hasegawa | 355/75 |
| 5,835,201 | * | 11/1998 | Itano et al. | 355/75 |
| 5,884,765 | * | 3/1999 | Stephenson | 206/455 |

* cited by examiner

Primary Examiner—Jerome Grant, II
(74) Attorney, Agent, or Firm—Merchant & Gould P.C.

(57) ABSTRACT

The present invention discloses an apparatus and a method for detecting the scanning range when applying the assistant frames in the flatbed scanners. Fixed marks allocated at the front side of the assistant frames are used to determine the sizes of the assistant frames. The required scanning ranges are thus determined according to the recognized assistant frames obtained from pre-scan. Only the front sides but whole of the assistant frames need to be pre-scanned, and thus to reduce the scanning time interval.

12 Claims, 6 Drawing Sheets

APPARATUS AND METHOD OF DETECTING A SCANNING RANGE WHEN APPLYING ASSISTANT FRAMES FOR FLATBED SCANNERS

BACKGROUND OF THE INVENTION

1. Field of the Invention

The invention relates to an apparatus and a method for detecting a scanning range when applying the assistant frames with fixed sizes for the flatbed scanners.

2. Description of the Prior Art

For the optics system such as scanners, a tendency has formed gradually from only scan reflective documents to scan transparent documents. In the present days, the flatbed scanners scan transparent documents such as projection drawings or lantern slides by means of additional assistant frames as aided. However, a pre-scan is necessary to obtain the scanning range when applying conventional assistant frames. Unfortunately, this conventional scan method needs a long time interval to perform, and its precision also can not achieve our requirements.

Referring to FIG. 1A, wherein a conventional assistant frame 11 is applied in a flatbed scanner for scanning a scanned document 113 (lantern slides or the like) that is placed at the center of the assistant frame 11. Please note that the conventional assistant frame 11 includes a front mark 111 and a rear mark 112 allocated at the front and rear sides of the scanned document 113, respectively. The front mark 111 encompasses three transparent marks with upright triangle arrangement, and the rear mark 112 encompasses three transparent marks with downright triangle arrangement. A pre-scan is performed to make sure the shape and position of front mark 111 and rear mark 112 before scanning the scanned document 113.

FIG. 1B represents a conventional assistant frame 12 used for scanning multiple transparent documents, and holding holes 123 are further designed for putting in or taking out the transparent documents conveniently. A front mark 121 and a rear mark 122 are also respectively allocated at the front and rear sides of the assistant frame 12. Similar to the usage of the assistant frame 11, a pre-scan is also performed to make sure the shape and position of front mark 121 and rear mark 122 before the scanned document 124 is scanned.

Please note that whole the assistant frames described in the FIG. 1A and FIG. 1B must be scanned to obtain marks information at the positions of the front and rear marks when performing the pre-scan. A sequent recognition operation is also required to recognize whether the front and rear marks are scanned and detected. Furthermore, operations for marking the required scanning ranges must be repeatedly performed to each transparent document. It is quiet a troublesome work to repeat the aforementioned operations when many transparent documents need to be scanned. Additional time is thus needed before scanning the scanned documents, and furthermore, the conventional flatbed scanners must waste a long time interval to complete required scan operations. A need has therefore been arisen to disclose an apparatus and a method, in which the time interval of the pre-scan can be reduced when applying the assistant frames in the flatbed scanners.

SUMMARY OF THE INVENTION

Accordingly, the invention discloses an apparatus and a method for detecting the scanning range when applying the assistant frames in the flatbed scanners. Fixed marks allocated at the front side of the assistant frames are used to determine the sizes of the assistant frames. The required scanning ranges can be determined according to the recognized assistant frames obtained from pre-scan. Only the front sides but whole of the assistant frames need to be pre-scanned and thus to reduce the scanning time interval.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
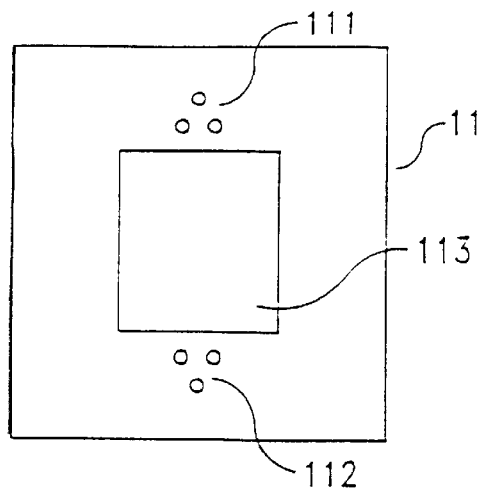
FIG. 1A depicts a conventional assistant frame used for scanning single transparent document in a flatbed scanner.
Figure 1B:
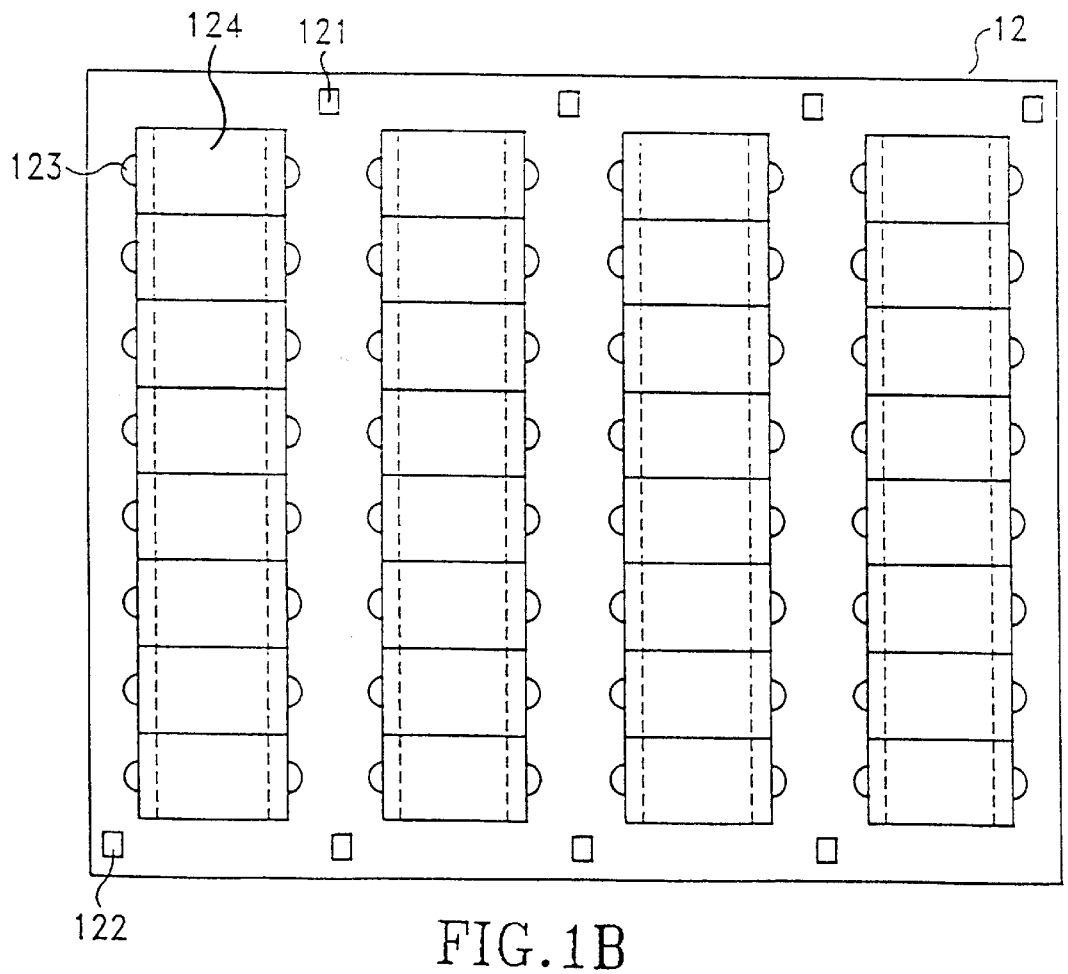
FIG. 1B represents a conventional assistant frame used for scanning multiple transparent documents.
Figure 2A:
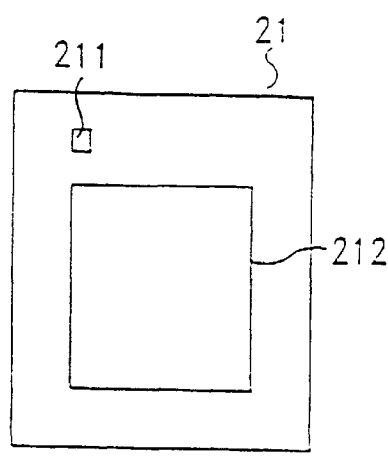
FIG. 2A is the first preferred embodiment of this invention, wherein only single transparent document is scanned in the assistant frame.
Figure 2B:
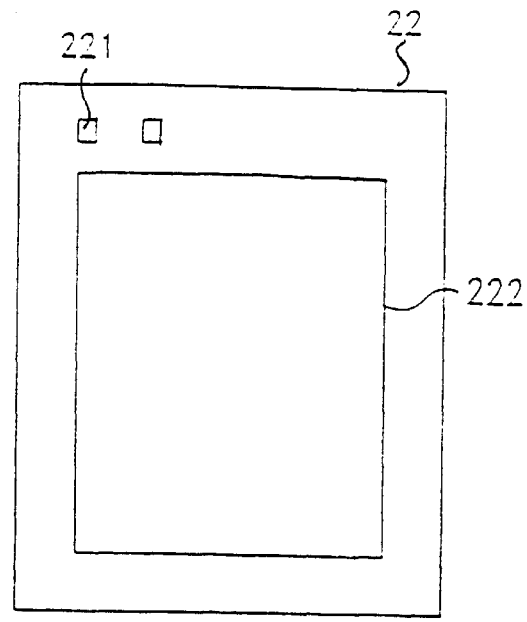
FIG. 2B is another assistant frame used for scanning single transparent document, wherein the size of the assistant frame is bigger than the counterpart disclosed in FIG. 2A.
Figure 2C:
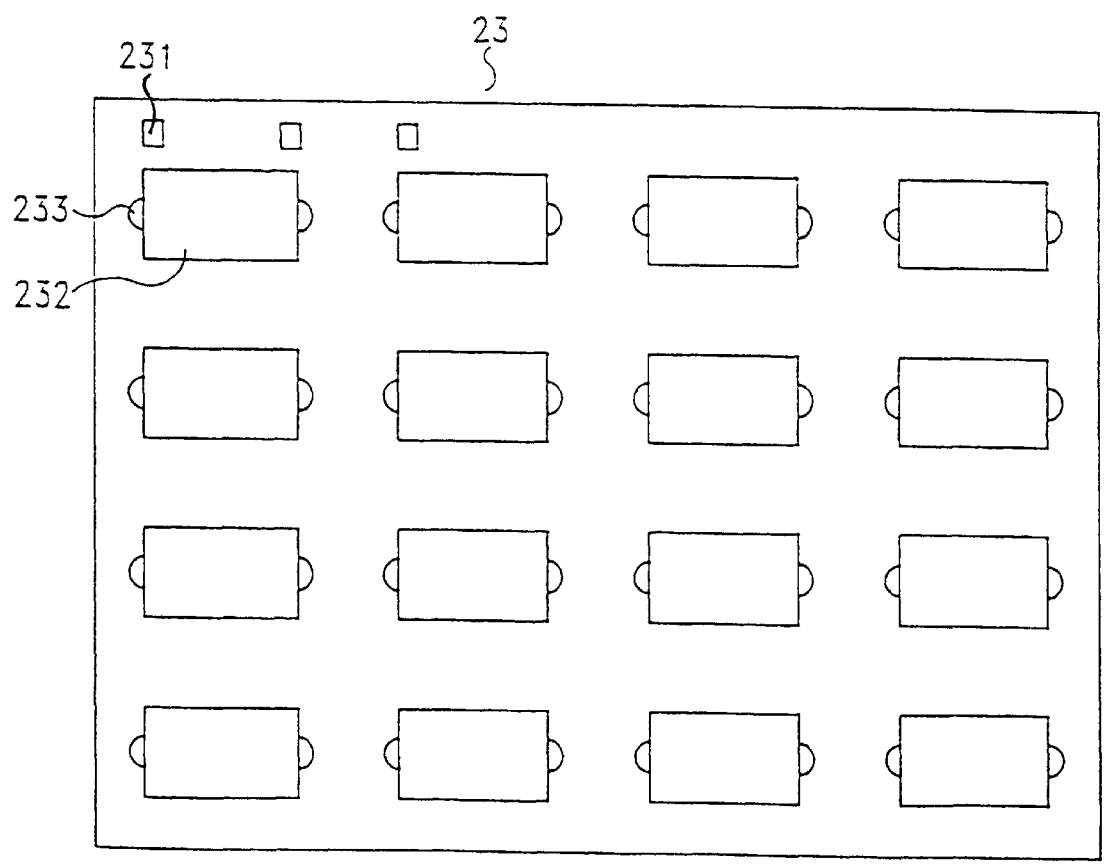
FIG. 2C is an assistant frame used for scanning multiple transparent documents.

FIGS. 2A, 2B and 2C represent assistant frames that utilize the first preferred embodiment of this invention for scanning. Referring to the FIG. 2A, which illustrates an assistant frame 21 that is employed for scanning single transparent document 212, and the assistant frame 21 only includes a fixed marks 211 allocated at the front side. FIG. 2B represents an assistant frame 22 with two fixed marks 221 and 222 also used for scanning single transparent document. In contrast with the assistant frame 21, the assistant frame 22 has bigger size than the assistant frame 21. FIG. 2C describes an assistant frame 23 with three fixed marks 231 allocated at the front side for scanning multiple transparent documents. Many holding holes 233 are also designed in the assistant frame 23 for putting in or taking out the transparent document conveniently. Please note that all the total number of the fixed marks in the assistant frames 21, 22, and 23 should not be mutually equal. Otherwise, the assistant frames 21, 22, and 23 can not be recognized clearly.

In addition, there is no constraint to the aforementioned total numbers as long as the assistant frames 21, 22, and 23 can be distinguished from the recognition results.

Figure 4:
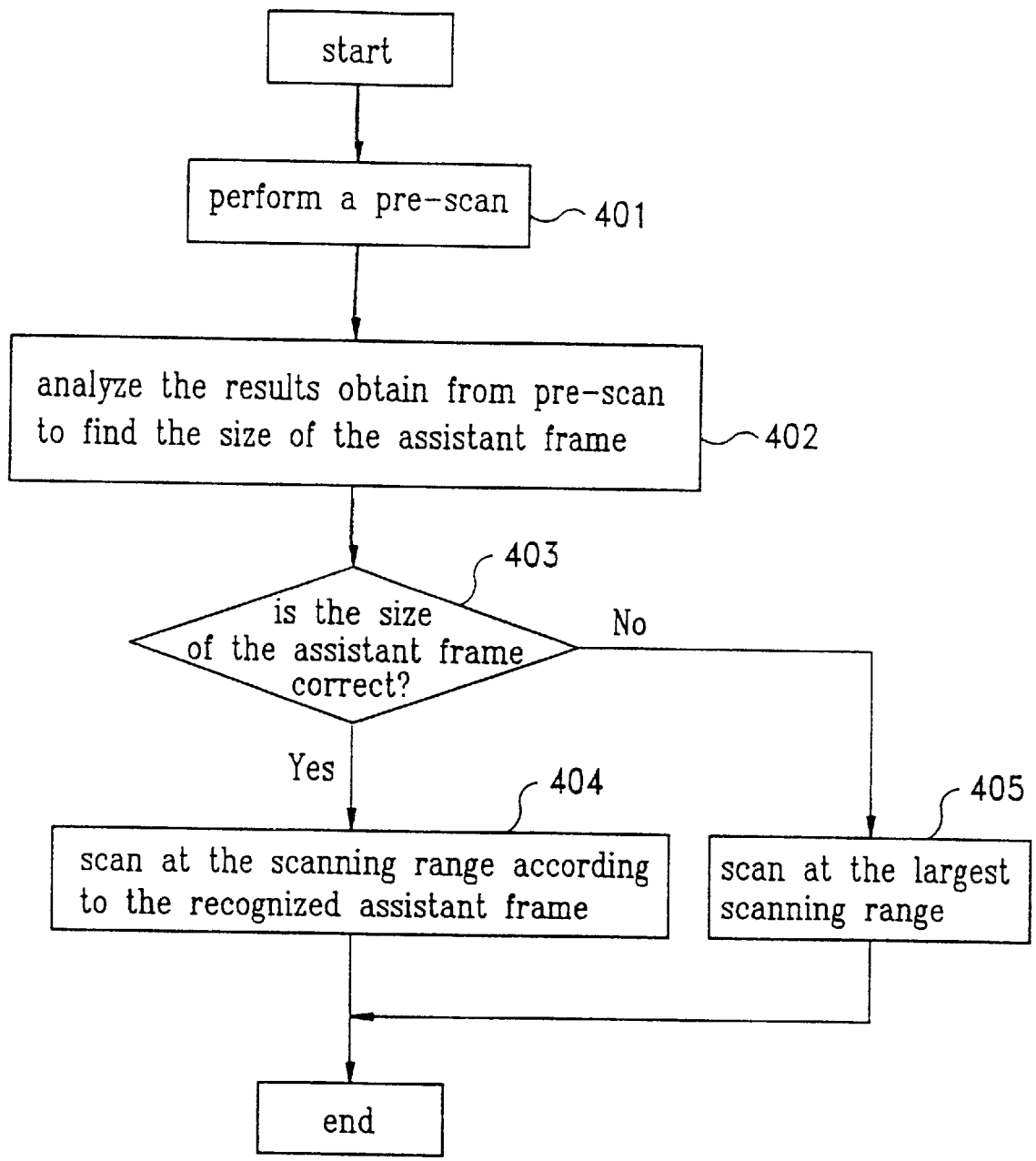
FIG. 4 demonstrates the detecting method used for the first embodiment.

Referring to FIG. 4, which represents a method used for recognizing what kind of the assistant frames are detected when the first preferred embodiment is applied. When a scanned document is placed in an assistant frame for scanning, a pre-scan is first performed (block 401). Next, scan information obtained from pre-scan is recognized to determine what kind of assistant frame is used (block 402). A scanning range according to the recognized assistant frame is then scanned (blocks 403 and 404). Otherwise, the largest scanning range is scanned when recognizing an unauthorized assistant frame (block 405). For example, when none or more than three fixed marks are recognized, the largest scanning range is scanned.

Figure 6A:
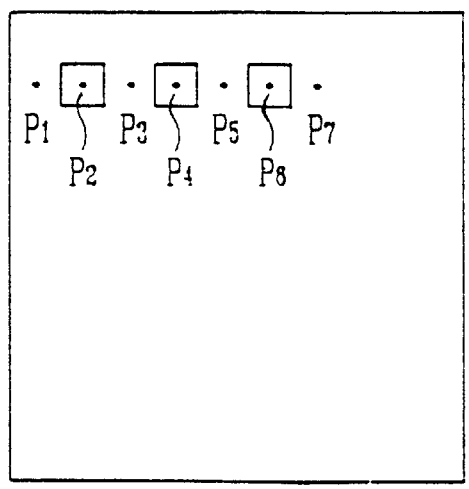
FIG. 6A illustrates the detecting positions of the method disclosed in FIG. 4.

An example illustrated in FIG. 6A is given for explaining the detecting operations used in the first embodiment, wherein seven detected points $P_1$, $P_2$, $P_3$, $P_4$, $P_5$, $P_6$, and $P_7$ are detected in the assistant frames. Among those seven detected points, $P_2$, $P_4$, and $P_6$ are hollowed holes (or transparent marks) but $P_1$, $P_3$, $P_5$, and $P_7$ are not. As noted, a response will show up when the detected point is a hollowed hole when giving a detecting signal to the detected point, and no response is obtained when the detected point is not the hollowed hole. Therefore, $P_1$, $P_3$, $P_5$, and $P_7$ will never response to the detecting signals, and the sizes of the assistant frames will determine the response situations when the detecting signals are given at the positions of $P_2$, $P_4$, and $P_6$. For example, in the block 403, it indicates that the assistant frame 21 is detected when only the detected point $P_2$ responses to the detecting signals. If the detected point $P_2$ and $P_4$ have responses when detecting, it implies that the assistant frame 22 is detected. The assistant frame 23 is detected when the detected points $P_2$, $P_4$, and $P_6$ response to the detecting signals. Therefore, the size of assistant frames and relative scanning ranges can be obtained according to above recognized results.

Figure 3A:
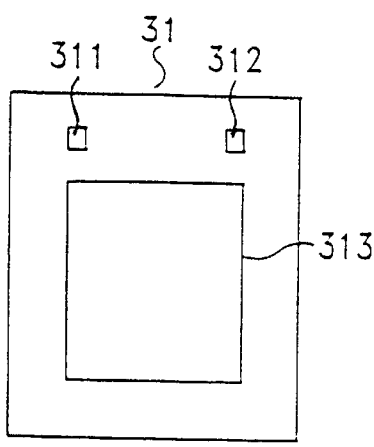
FIG. 3A is the second preferred embodiment of this invention, wherein only single transparent document is scanned in the assistant frame.
Figure 3B:
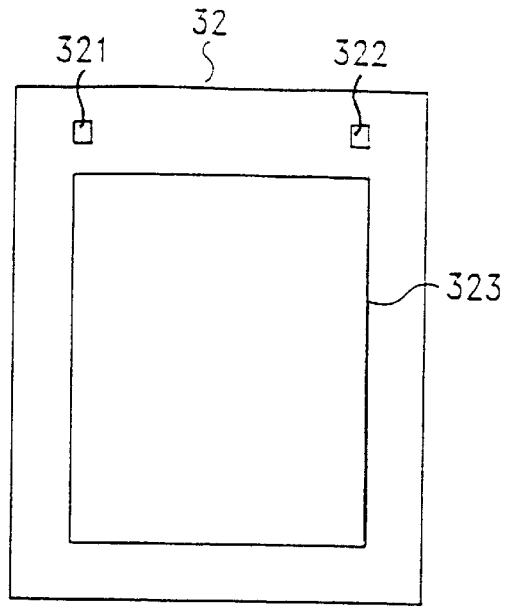
FIG. 3B is another assistant frame used for scanning single transparent document, wherein the size of the assistant frame is bigger than the counterpart disclosed in FIG. 3A.
Figure 3C:
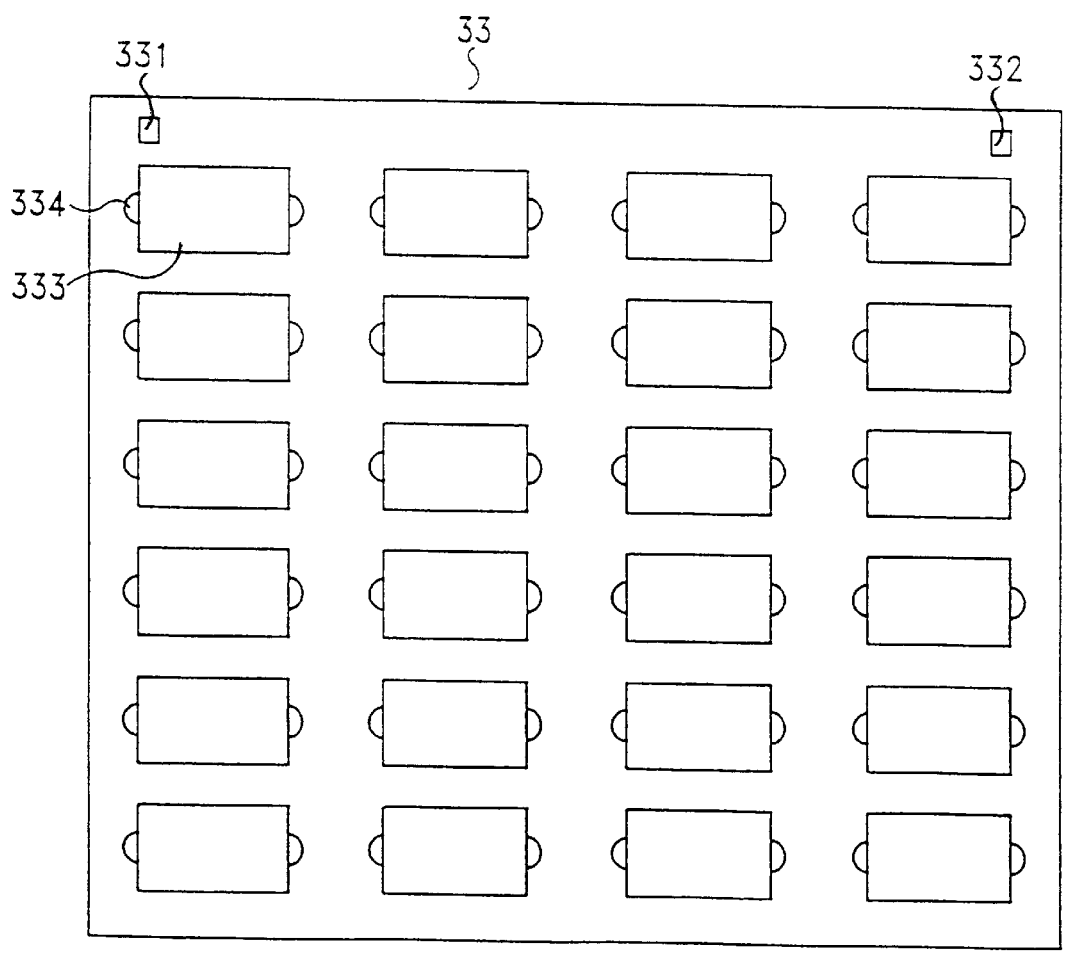
FIG. 3C is an assistant frame used for scanning multiple transparent documents.

FIGS. 3A, 3B and 3C represent assistant frames that utilize the second preferred embodiment of the invention for scanning. Referring to the FIG. 3A, which illustrates an assistant frame 31, that is employed for scanning single transparent document 313. Please note that the assistant frame 31 includes two fixed marks 311 and 312 respectively allocated at two fixed points of the front side. FIG. 3B represents an assistant frame 32 with two fixed marks 321 and 322 also used for scanning single transparent document 323. In contrast with the assistant frame 31, the assistant frame 32 has bigger size than the assistant frame 31. FIG. 3C describes an assistant frame 33 having two fixed marks 331 and 332 respectively allocated at two fixed points of the front side for scanning multiple transparent documents 333. Many holding holes 233 are also designed in the assistant frame 33 for putting in or taking out the transparent document conveniently. Please note that all the distances between the fixed marks of the assistant frames 31, 32, and 33 should not be mutually equal. Otherwise, the assistant frame 31, 32, and 33 can not be recognized clearly. In addition, there is no constraint to the aforementioned distances as long as the assistant frames 31, 32, and 33 can be distinguished from the recognition results. For example, the distance can increase (decrease) as the size of the assistant frame increases (decrease).

Figure 5:
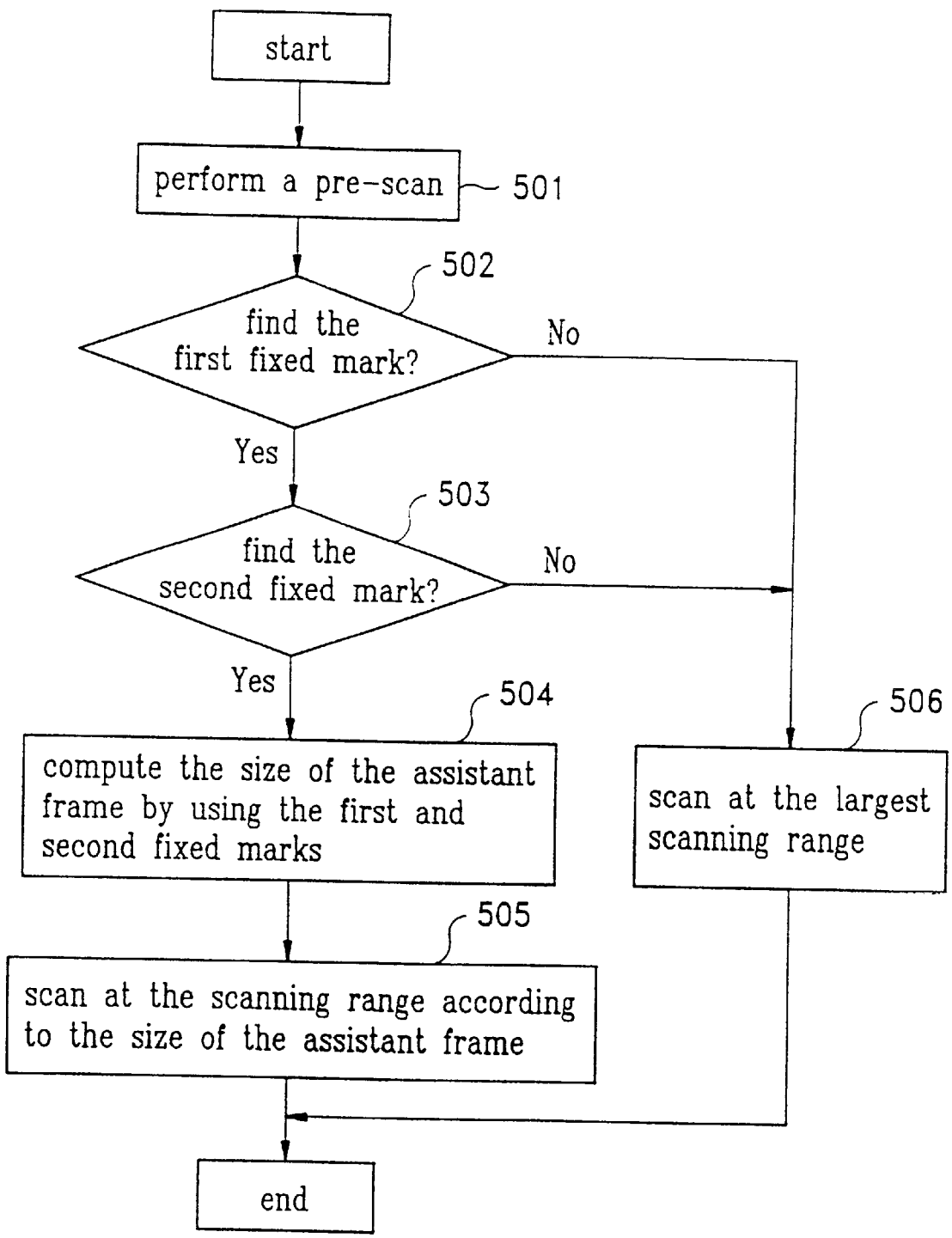
FIG. 5 demonstrates the detecting method used for the second embodiment.

Referring to FIG. 5, which represents a method used for recognizing what kind of the assistant frames are detected when the second preferred embodiment is employed. When a scanned document is placed in an assistant frame for scanning, a pre-scan is first performed (block 501). Next, the first and second fixed marks are sequentially detected (blocks 502 and 503). After the two fixed marks are detected, the distance between the two fixed marks is computed to determine what kind of assistant frame is used (block 504). A scanning range according to the recognized assistant frame is then scanned (block 505). Otherwise, the largest scanning range according to the flatbed scanner is scanned when the first or second fixed marks can not be detected, or when the computed distance relative to none of the assistant frames, (block 506).

Figure 6B:
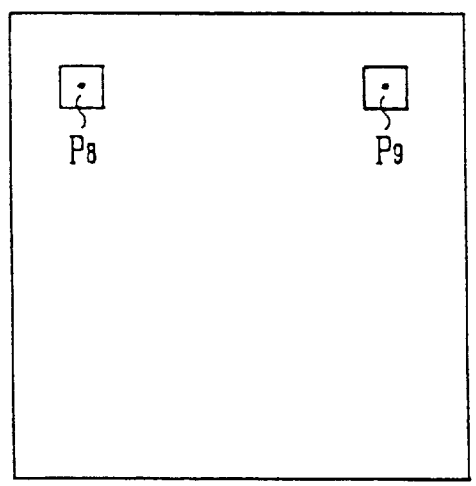
FIG. 6B illustrates the detecting positions of the method disclosed in FIG. 5.

An example illustrated in FIG. 6B is also given for explaining the detecting operations used in the second embodiment, wherein two detected points $P_8$ and $P_9$ are detected in the assistant frames. Similar to the detected points in the FIG. 6A, a response will show up when the detected point is a hollowed hole (or transparent mark) when giving a detecting signal to the detected point, and no response is obtained when the detected point is not the hollowed hole. Therefore, in the block 504, the distance between the two detected points $P_8$ and $P_9$ will determine size of the assistant frames.

After completing scan operations to the transparent documents, the flatbed scanner can establish image files according to the transparent document numbers including in the assistant frames. Thus, both the assistant frames 23 and 33 will generate at least one scanned image files. Moreover, it is unnecessary to perform the operations that repeat to mark the required scanned ranges in a computer screen.

Please note that all the parameters of the assistant frames such as the positions and distances of fixed marks, and the scanning range according to the assistant frames can be stored in a non-volatile memory. For example, a ROM (Read Only Memory), a flash memory, an EPROM (Erasable Programmable ROM), or an EEPROM (Electrically Erasable Programmable ROM) can be used to stored these parameters. Another implementation is to load the parameters after loading the scan driven module.

In conclusion, the invention discloses an apparatus and a method for detecting the scanning range when applying the assistant frames in the flatbed scanners. Fixed marks allocated at the front side of the assistant frames are used to determine the sizes of the assistant frames. The required scanning ranges can be determined according to the recognized required scanning ranges obtained from pre-scan. Only the front sides but whole of the assistant frames need to be pre-scanned and thus to reduce the scanning time interval.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An assistant frame adaptable for a scanner for detecting a scanning range of a transparent document, comprising:

a solid frame having at least one empty grid for placing said transparent document; and at least one fixed mark formed at the front end of said solid frame;

wherein a total number of said at least one fixed mark and a distance between every two fixed marks determines the scanning range of said transparent document.

2. The assistant frame according to claim 1, wherein said at least one fixed mark is a through hole.

3. The assistant frame according to claim 1, wherein the total number of said at least one fixed mark increases as the size of said solid frame increases.

4. The assistant frame according to claim 1, wherein the distance between every two fixed marks increases as said scanning range of said transparent document increases.

5. The assistant frame according to claim 1, further comprising:
holding holes formed on two sides of each of said at least one empty grid for the convenience of handling said transparent document.

6. An apparatus adaptable for a scanner for detecting a scanning range of a transparent document, comprising:
an assistant frame having a solid frame, at least one fixed mark formed on the front end of said solid frame for indicating the scanning range of said transparent document, and at least one empty grid for placing said transparent document;
means for determining the scanning range of said transparent document by detecting a total number of said at least one fixed mark and a distance between every two fixed marks; and
pre-scan means for reading an image information of said transparent document according to the scanning range of said transparent document determined by said determining means.

7. The apparatus according to claim 6, wherein the total number of said at least one fixed mark increases as the size of said solid frame increases.

8. The apparatus according to claim 6, wherein the distance between every two fixed marks increases as said scanning range of said transparent document increases.

9. The apparatus according to claim 6, further comprising:
holding holes formed on two sides of each of said at least one empty grid for the convenience of handling said transparent document.

10. A method for detecting a scanning range of a transparent documents for a scanner, comprising the steps of:
providing a plurality of assistant frames each having a predetermined size of empty grid for fitting a transparent document;
marking the predetermined size of each of said plurality of assistant frames by forming through holes on the front end of each of said plurality of said assistant frames;
placing said transparent document on said scanner with a selected assistant frame;
performing a pre-scan procedure to read information of said through holes on the front end of said selected assistant frame;
determining the scanning range of said transparent document by detecting a total number of said through holes and a distance between every two through holes; and
scanning said transparent document according to said determined scanning range of said transparent document.

11. The method as claimed in claim 10, further comprising a step of:
reading a predetermined largest scan range for said transparent document when no assistant frame is applied.

12. The method as claimed in claim 10, further comprising a step of:
forming holding holes on two sides of each empty grid of said plurality of assistant frames for the convenience of handling said transparent document.

* * * * *